March 13, 1956     K. M. ELLIOTT     2,738,308
METHOD OF OPERATING A SPLIT-FLOW REFORMER
Filed May 1, 1952     2 Sheets-Sheet 1
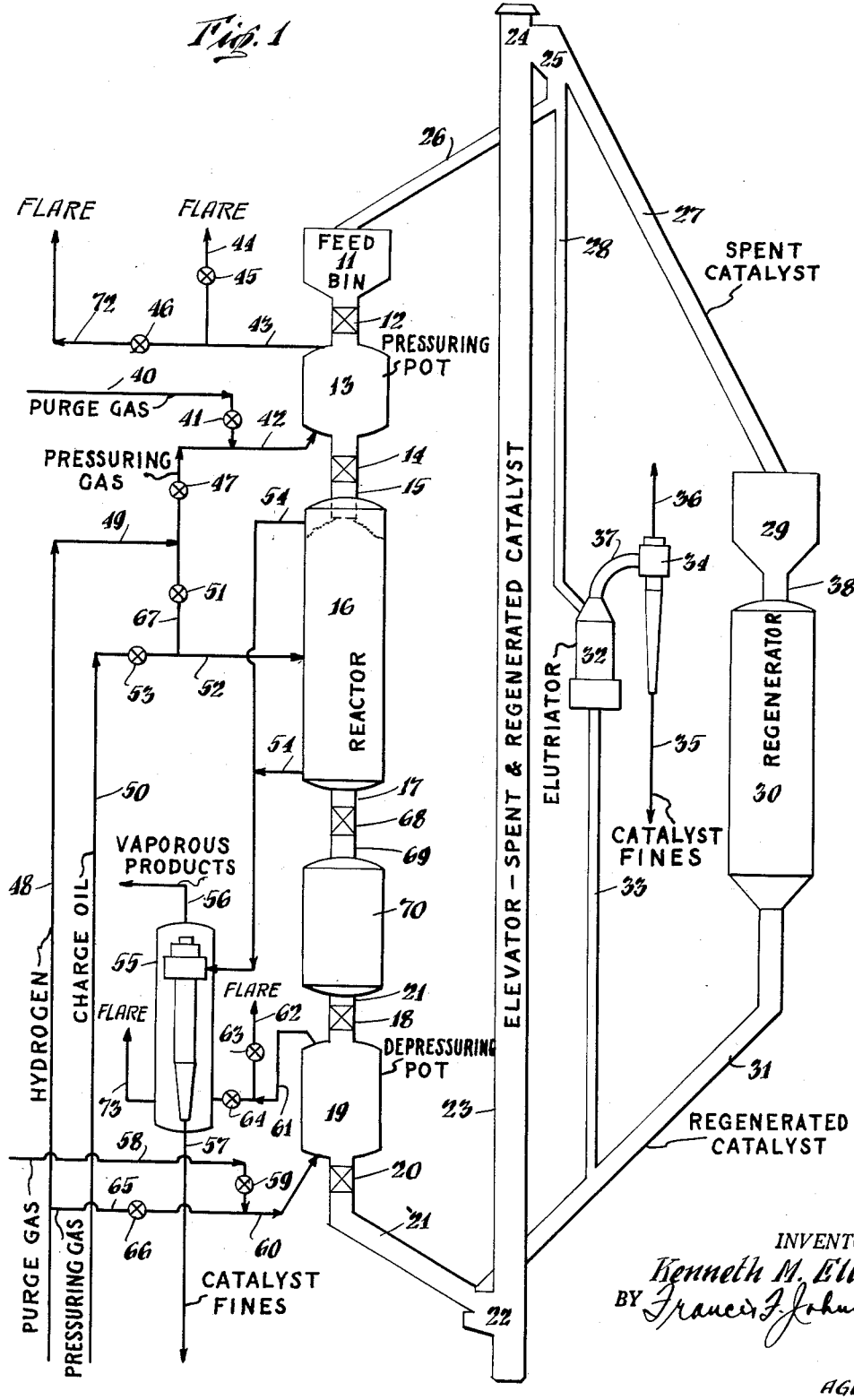

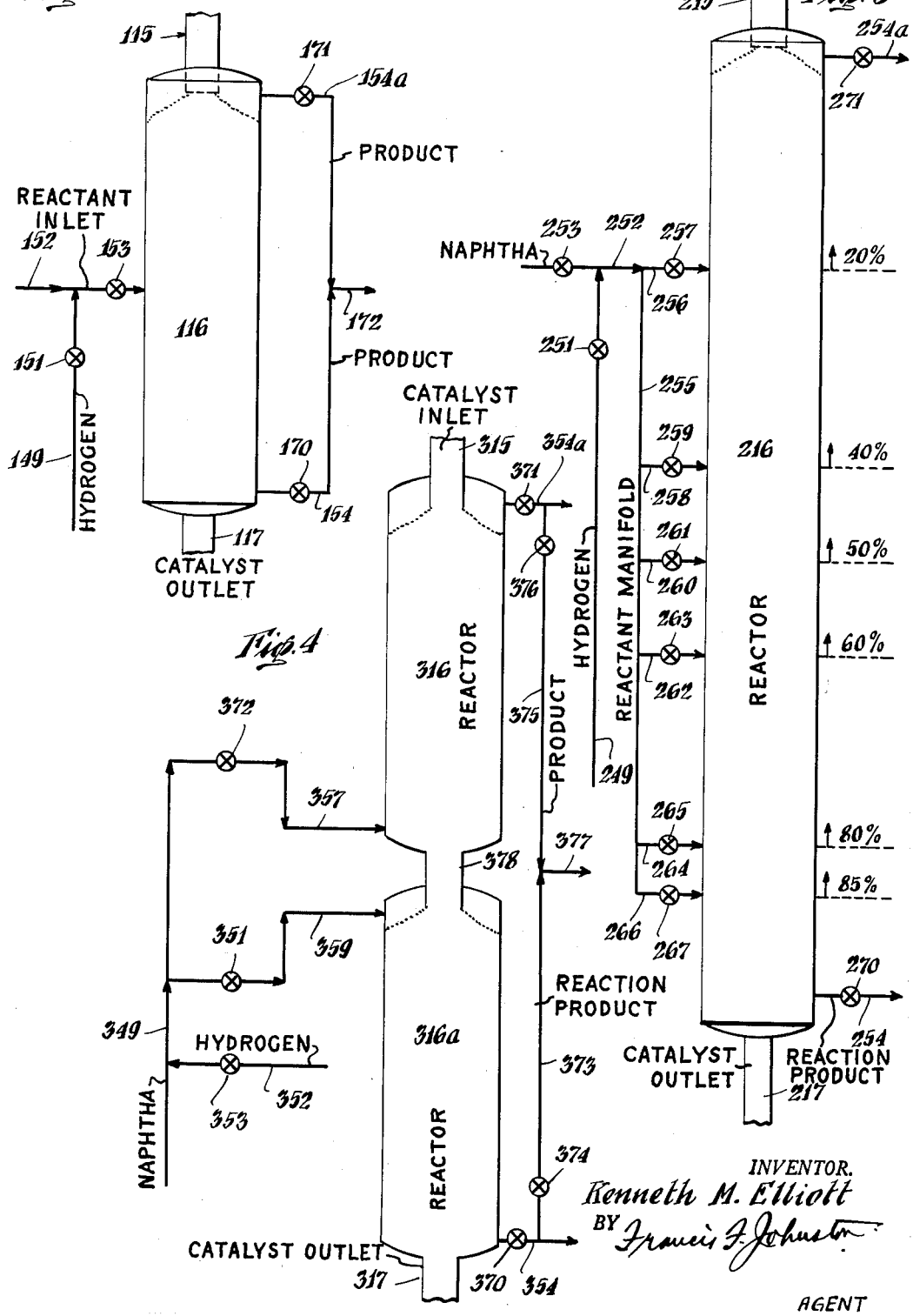

United States Patent Office 2,738,308
Patented Mar. 13, 1956

2,738,308

METHOD OF OPERATING A SPLIT-FLOW REFORMER

Kenneth M. Elliott, Woodbury, N. J., assignor to Socony Mobil Oil Company, Inc., a corporation of New York Application May 1, 1952, Serial No. 285,481

10 Claims. (Cl. 196—50)

The present invention relates to a method of hydrogenating, dehydrogenating and aromatization of hydrocarbons, generally known as reforming and more particularly to a method of catalytic reforming in which preferably at least 75% of the heat required for the reaction is supplied by the vaporous reactants.

It is an object of the present invention to provide a method of operating a catalytic reformer in which a major portion of the heat required for the reaction is supplied by the vaporous reactants and in which the vaporous reactants are introduced at a point intermediate the catalyst inlet and the catalyst outlet and reaction products and unreacted reactants are removed both at the top of the reactor and at the bottom of the reactor. It is another object of the present invention to provide a method of operating a split-flow reformer so that the portion of the feed passing through any section of the reactor is controlled. It is a further object of the present invention to provide a method of operating a split-flow reformer to control the division of the catalyst bed to produce an increased yield of gasoline of given octane number. It is also among the objects of the present invention to control the division of the catalyst bed and the distribution of the charge introduced into a split-flow reformer to increase the yield of gasoline of a given octane number. Other objects and advantages will become apparent from the following description taken in conjunction with the drawings in which—

Figure 1 is a highly diagrammatic illustration of prior art method of operating a moving bed catalytic reformer.

Figure 2 is a highly diagrammatic illustration of a method of operating a split-flow catalytic reformer to produce an increased yield of gasoline of given octane number from a given charge stock, wherein the division of the charge stock is controlled.

Figure 3 is a highly diagrammatic illustration of a method of operating a split-flow catalytic reformer to produce an increased yield of gasoline from a given charge stock when division of both catalyst bed and charge introduced into the reformer is controlled; and Figure 4 is a highly diagrammatic illustration of a method of operating two reactors in series in which the distribution of the charge stock is controlling to produce an increased yield of gasoline.

In general, catalytic reforming comprises contacting a suitable reforming catalyst with a primarily aliphatic charge stock usually a naphtha having a boiling range of about 150° to about 450° F. under conditions of temperature and pressure such that hydrogenation, dehydrogenation and cyclization occur. At the present, it is preferred to employ a chromia-alumina catalyst comprising at least 70 mole per cent alumina and about 18 to about 30 mole per cent chromia, although other particle form reforming catalysts can be used. The reforming reaction or reactions are carried out at a temperature of about 800° to about 1300° F. at a pressure of about 15 to about 600 p. s. i. a. However, it is preferred to use reaction temperatures of about 900° to about 1050° F. and pressures of about 100 to 300 p. s. i. a.

During the reforming operation, the particle form solid contact material or particle form catalyst becomes deactivated by a deposition of carbonaceous contaminant. This contaminant is removed and the catalyst activated by burning off the carbonaceous contaminant in a stream of combustion supporting gas such as air at elevated temperatures below the catalyst damaging temperature and usually at about 600° to about 1400° F. and preferably at about 700° to about 1100° F. at a pressure of about 15–600 p. s. i. a. and presently, preferably at about 15 to about 35 p. s. i. a.

A summary of the operating ranges are given in the following tabulation:

|  | Broad | Preferred |
|---|---|---|
| Reactor: |  |  |
| Vapor Inlet Temp., ° F | 850–1,080 | 900–1,050 |
| Catalyst Inlet Temp., ° F | 100–1,100 | 400–800 |
| Pressure, p. s. i. a | 15–600 | 100–300 |
| Gas Recycle Ratio: |  |  |
| Mols Gas/Mols Naphtha | 1–15 | 4–10 |
| Mols Hydrogen/Mols Naphtha | 1–8 | 2–5 |
| Average Liquid Space Velocity in Reactor | 0.2–4.0 | 0.4–2.0 |
| Vol. Percent of Bed Above Reactor Inlet | 85–20 | 75–40 |
| Vapor Stream Heat Capacity/Catalyst Stream Heat Capacity | 100–1 | 40–5 |
| Percent Vapor Flow to Upper Reforming Zone of Reactor | 80–20 | 60–35 |
| Kiln: |  |  |
| Temp., ° F | 600–1,400 | 700–1,100 |
| Pressure, p. s. i. a | 15–600 | 15–35 |

The catalyst enters the reactor or convertor at a temperature of about 100° to about 1100° F. and preferably at a temperature of about 400° to about 800° F. However, the catalyst inlet temperature is not particularly important since a major portion of the heat is supplied by the vapor charge.

The prior art reforming of a suitable primarily aliphatic charge stock such as a primarily aliphatic naphtha having a boiling range of about 150° to about 450° F. under reforming conditions of pressure and temperature is illustrated in Figure 1 for a reforming conversion in the presence of about 1–15 preferably about 2–5 mols of recycle gas per mol of naphtha or of about 1 to about 8 mols preferably about 2–5 mols of hydrogen per mol of naphtha; the molecular weight of the naphtha being determined in the usual manner from the A. S. T. M. distillation curve.

Thus, a suitable active reforming catalyst is accumulated in catalyst feed bin 11, flows therefrom into a reactor or convertor sealing means such as the pressuring lock formed between gas-tight valves 12 and 14 and including pressuring chamber or pot 13 when the reactor is operating at a pressure greater than 15 p. s. i. a.

The particular sealing means illustrated operates in a cyclic manner as follows: With gas-tight valves 12 and 14 closed and pressure pot 13 substantially devoid of catalyst a purge gas, i. e., an inert and/or non-flammable gas, such as flue gas is drawn from a source not shown through lines 40 and 42 with valve 41 open and valve 47 closed. The purge gas is vented from pressuring pot 13 through lines 43 and 44 with valve 46 closed and valve 45 open. After purging pressuring chamber 13 with gas-tight valve 14 closed, gas-tight valve 12 is opened and catalyst flows into pressuring pot 13 to a predetermined level. Gas-tight valve 12 is closed and pressuring gas such as recycle gas containing about 25 to about 80, preferably about 35 to about 60 per cent hydrogen and the balance $C_1$ to $C_6$ hydrocarbons introduced into pressuring chamber 13 until the pressure in chamber 13 is at least that of reactor 16. Usually the pressure in chamber 13 is raised to about 20 to about 600 p. s. i. a. dependent upon the pressure in reactor or convertor 16.

The pressure in pressuring chamber 13 is raised to at least that of reactor 16 by introducing a recycle gas, for example—drawn from a source not shown, through lines 48 and 49 and with gas-tight valves 12 and 14 closed, valves 41, and 45 and 46 closed, and valve 47 open introduced through line 42 into pressuring chamber 13.

After the pressure in pressuring chamber 13 has been raised to at least that of reactor or convertor 13, valve 47 is closed and gas-tight valve 14 opened and the catalyst flows as a compact column into the reactor 16 through line 15. When pressuring chamber 13 is empty of catalyst, gas-tight valve 14 is closed, valve 46 is opened, and the pressure in pressuring pot 13 is brought to atmospheric by passing the residual gas contained therein through lines 43 and 72 to a flare not shown. This completes the cycle. It will be understood by those skilled in the art that there can be a pair of sealing means such as the pressure lock, described hereinbefore, operating alternately and feeding catalyst into one reactor. From this point the course of the catalyst through the reactor and regenerator will be followed and then the course of the charge stock through the reactor to refining or storage will be followed.

The catalyst enters reactor 16 at a temperature of about 100° to about 1100° F. and preferably at about 400° to about 800° F. The catalyst flows downwardly through convertor 16 as a compact column of particle form solid contact material. The spent catalyst leaves reformer 16 through conduit 17. The catalyst then flows through a suitable catalyst flow control device such as valve 68, through conduit 69, into surge pot 70 and thence through a suitable reactor sealing means.

When the pressure in reactor 16 is greater than 15 p. s. i. a., a suitable sealing means is necessary. For example, the depressuring lock formed between gas-tight valves 18 and 20 and including depressuring chamber or pot 19 or other methods for removing catalyst from a high pressure reactor can be employed.

The depressuring lock formed between gas-tight valves 18 and 20 operates in a cyclic manner similar to that previously described for the pressuring lock as follows: With gas-tight valves 18 and 20 closed, pressuring gas such as the aforenoted recycle gas is drawn from a source not shown through pipes 48, 65 and 60 with valves 59, 63 and 64 closed and valve 66 open and introduced into depressuring pot 19 until the pressure therein is at least equal to that in the reactor. Valve 66 is then closed and gas-tight valve 18 opened. Spent catalyst from surge pot 70 flows through conduit 21 and valve 18 to fill the depressuring pot 19 to a pre-determined level at which time gas-tight valve 18 is closed. The pressure in depressuring pot 19 is then reduced to that of the kiln or regenerator which is about 15 to about 600 p. s. i. a. and preferably, presently, about 15 to about 35 p. s. i. a. by opening valve 64 and passing the gas contained therein through lines 61 and 73 to a flare not shown.

When the pressure in depressuring pot 19 has been reduced to at least that of the kiln, valve 64 is closed and with valve 66 closed and valve 63 and 59 open, purge gas, i. e., inert and/or non-flammable gas such as flue gas is introduced into depressuring pot 19 through pipes 58 and 60 and vented through pipes 61 and 62. After purging depressuring pot 19, gas-tight valve 20 is opened and the catalyst flows into chute 21. After depressuring, pot 19 is empty of catalyst, and valve 20 is closed, thus completing the cycle.

The catalyst flows through chute 21 to any suitable catalyst transferring device such as a gas-lift and the like or, as illustrated, an elevator such as bucket elevator 23 having boot 22. The catalyst flows through chute 21 into elevator boot 22 where it is picked up by the elevator buckets and raised to elevator head 24 where the buckets discharge into spout 25.

The elevator 23 is of the type more fully described in U. S. Patent No. 2,531,192, and is provided with divided buckets. Activated or regenerated catalyst from kiln or regenerator 30 falls into one pocket of a bucket while deactivated or coked catalyst from reactor 16 falls into another pocket of the aforesaid bucket.

Elevator spout 25 is provided with a divided discharge so constructed that regenerated catalyst falls through chute 26 and 28 while contaminated or deactivated catalyst falls into chute 27.

The fines discharged from elevator spout 25 pass through conduit 28 to gas elutriator 32 where the larger particles are discharged through conduit 33 into chute 31 while the smaller particles pass through conduit 37 to cyclone 34. In cyclone 34 the catalyst particles pass out through conduit 35 while the gas escapes through vent 36.

The deactivated catalyst passes from elevator spout 25 through chute 27 to kiln or regenerator bin 29.

Kiln or regenerator 30 is of any suitable type wherein the carbonaceous catalyst contaminant can be burned off at elevated temperatures in a combustion-supporting stream of gas at a temperature of about 600° to about 1400° F., and preferably at about 700° to about 1100° F., under a pressure of about 15 to about 600 p. s. i. a. and preferably presently at about 15 to about 35 p. s. i. a. Presently, it is preferred to employ a multi-stage kiln or regenerator having alternate burning and cooling zones such as is more fully described in U. S. Patent No. 2,469,332. Briefly, the multi-stage kiln or regenerator comprises an uppermost surge section and about 6 to about 20 burning zones alternating with cooling zones; the number of burning stages or zones being dependent upon the amount of carbonaceous contaminant to be burned off the catalyst. The cooling zones or stages are provided with heat transfer tubes through which a heat transfer medium such as high pressure steam, water, low melting alloys or fused inorganic salts may be passed. Details of the kiln, forming no part of this invention, are not shown in Figure 1.

The catalyst passes from bin or hopper 29 through conduit 38 into kiln 30 and descends through the alternating burning and cooling zones to a surge zone at the bottom of the kiln which can be provided with cooling means to reduce the temperature of the catalyst to that required in reactor feed bin 11. The catalyst flows into chute 31 through which it passes to any suitable catalyst transfer device such as a gas-lift or, as illustrated, to boot 22 of elevator 23 previously described. The regenerated catalyst is raised by the elevator to elevator head 24 where the regenerated catalyst is discharged into spout 25 from whence it flows through chute 26 to reactor catalyst feed bin or hopper 11 ready for another cycle.

The charge to be reformed is drawn from a source, not shown, heated in a furnace, not shown, and then passed through lines 50 and 52 under control of valve 53 to the approximate mid-point of reactor 16. When the reforming conversion is to be carried out in the presence of hydrogen, or a gas containing hydrogen such as a recycle gas containing about 25 to about 80 preferably about 35 to about 60 per cent hydrogen and the balance $C_1$ to $C_6$ hydrocarbons is drawn from a source not shown, heated in a furnace, not shown, and passed through pipes 48, 49 and 67, regulated by valve 51, into line 52 to admix with the charge in the ratio of about 1 to about 8 and preferably about 2 to about 5 mols of hydrogen per mol of naphtha. (The molecular weight of the naphtha being determined in the usual manner from the A. S. T. M. distillation curve.)

The charge is heated to a temperature of about 850° F. to about 1050° F. and the recycle gas to about 850° to about 1300° F. such that the mixture enters the reactors at about 850° to about 1100° F. The charge mixture, for example, naphtha and recycle gas contacts the substantially compact catalyst column in the reforming zone of reactor 16 which is maintained at a temperature of about 850° F. to about 1100° F. and at a pressure of about 15 to about 600 p. s. i. a.

The gaseous reactants together with catalyst fines are withdrawn from the reactor through line 54 to cyclone separator 55 from which the catalyst fines are rejected through conduit 57 and from which the gaseous products of the reactor leave through line 56. The vaporous products pass through line 56 to treatment (not shown) to remove hydrogen and low molecular weight hydrocarbons for recycle gas, distillation, debutanizing and depropanizing, other treatment and storage and distribution.

More recently it has been proposed to operate a reformer by introducing the feed at the mid-point of the reactor and withdrawing the vaporous reformate, i. e., products of conversion from both the top and the bottom of the reactor. However, when the major portion, or at least 75 per cent and preferably at least 90 per cent or more of the heat required for the reforming conversion is supplied in the vapor stream, such an operation results in establishing more severe conditions in the lower half of the reactor than exist in the upper half of the reactor. As a consequence, the reformate is produced in the upper half of the reactor at a higher yield of lower octane number than the reformate produced in the lower half of the reactor. This is illustrated by the following data:

*Table I*

Charge: Virgin East Texas Naphtha—B R 200°–400° F.
  Octane number (F–1 clear)=42
  Octane number (F–1+3 cc. TEL)=66
Catalyst: Chromia-alumina reforming catalyst
Average operating conditions in reactor:
  Pressure, 100 p. s. i. a.
  Space velocity, 0.7
  Vapor inlet temp., ° F., 1050
  Catalyst inlet temp., ° F., 800
  Gas recycle ratio, Mols gas/Mols naphtha=6
  Mols hydrogen/Mols naphtha=3
  Vapor stream heat capacity/Catalyst stream heat capacity=14

|  | Section of Reactor | |
| --- | --- | --- |
|  | Top | Bottom |
| Volume of Catalyst Bed, percent of total bed | 50 | 50 |
| Volume of vapors in section, percent of total feed | 50 | 50 |
| Liquid Space Velocity | 0.7 | 0.7 |
| Vapor Inlet Temp., ° F | 1050 | 1050 |
| Vapor Outlet Temp., ° F | 969 | 981 |
| Av. Reactor Temp., ° F | 985 | 995 |
| Gasoline Yield, Vol. Percent: |  |  |
|   Total Reactor Charge | 43.3 | 40.0 |
|   Charge to section | 86.6 | 80.0 |
| Octane Number, F–1 Clear | 91.6 | 95.4 |
| Octane Number, F–1+3 cc. TEL | 99.3 | 101.2 (iso+0.12) |
| Octane Number of Total Reformate, F–1 Clear | 93 | |
| Octane Number of Total Reformate, F–1+3 cc. TEL | 100 | |
| Overall Gasoline Yield, Vol. Percent of Reactor Charge | 83.3 | |

It has now been discovered that when a major portion usually at least about 75% and preferably at least 90% or more of the heat required by the reforming conversion is supplied in the vapor stream the overall yield of gasoline can be increased at least 1%. Small as this increase is percentagewise in the operation of a 15,000 B./D. reformer it represents about $200,000 per year increased income. Such an increased yield is obtained by operating the reformer with split-flow feed in such a manner as to produced reformates of equal octane numbers in both sections or equal yields, based upon the charge to the reactor section, of gasoline in the products from both stages whereby a higher overall gasoline yield based on total charge feed is obtained for a given octane number level than would be obtained by equal distribution of the feed to beds of equal volume.

By split-flow feed operation of a reformer is meant either (a) a reformer having a single level inlet positioned in a single vessel intermediate the ends thereof and having product or reformate outlets adjacent the two ends of the vessel or, (b) having a plurality of pairs of reactant inlets intermediate the ends of the reformer and having product or reformate outlets adjacent both ends of the reformer or, (c) two vessels arranged for catalyst flow therethrough in series in which there is upward flow of vapors countercurrent catalyst flow in the one with downward flow of reactant vapors concurrent with catalyst flow in the other.

The improved results mentioned hereinbefore are obtained in a reformer operation wherein the vapor stream heat capacity is controlling. That is, the ratio of the vapor stream heat capacity to the catalyst stream heat capacity is greater than 1 or $$\frac{(\text{Lbs. of vapor}) \ (\text{specific heat})}{(\text{Lbs. catalyst}) \ (\text{specific heat})} = >1$$

When operating a reformer with a split-flow feed wherein the major portion and preferably at least about 75 per cent and particularly at least about 90 per cent or more of the heat required for the reforming conversion is supplied by the vapor stream, the temperature in the lower reforming stage (with respect to the catalyst inlet) exceeds that in the upper reforming stage so that the reforming conditions would be more severe in the lower stage when the space velocities in the two stages are equal. As a consequence of this difference in the severity of conditions in the two reforming stages, the yield from the lower stage is less than from the upper stage. Referring to Table I it will be noted that in the upper reforming stage the yield from 50 per cent of the feed was 43.3 per cent or 86.6 per cent of the charge to the upper reforming zone while the yield from the lower reforming stage or zone from 50 per cent of the feed was 40 per cent or only 80.0 per cent of the charge to the lower reforming zone. The apparatus illustrated in a highly diagrammatic manner in Figures 2, 3 and 4 are exemplary of the method of operating a split-flow feed reformer to overcome the difficulties discussed hereinbefore and provide for an overall increase in yield of gasoline. In studying Figures 2, 3 and 4, those skilled in the art will recognize that the reformers 116 and 216 and the two reformers 316 and 316a function with respect to the generator, sealing means, etc. shown in Figure 1 and discussed therewith in the same manner as reformer or reactor or convertor 16. Accordingly, in the discussion of the illustration of various embodiments of the present invention as provided in Figures 2, 3, and 4 only the reactors have been shown and will be discussed hereinafter.

In Figure 2 is illustrated the simplest but less flexible method of operating a split-flow feed reformer to obtain increased overall yield of gasoline.

The reformer or convertor 116 is provided with a catalyst inlet 115 and a reactant inlet 152 serving a reactant distributor (not shown) constructed and arranged to introduce reactant vapors into the reactor or convertor 116 at about the mid-point thereof. In this manner the total catalyst bed of the reactor is effectively divided into two beds of substantially equal volume. Consequently, without other means for regulating the space velocities in upper and lower reforming zones, the space velocities in both zones would be the substantially same and the reforming conditions in the lower reforming zone more severe than in the upper reforming zone. As a consequence of the more severe reforming conditions in the lower zone the yield of gasoline therefrom would be lower and the overall yield of gasoline of given octane number would be lower than that obtained if reforming conditions of equal severity existed in both zones. However, in accordance with the principles of the present invention the space velocities in the two zones are regulated so that reforming conditions of equal severity obtain in both zones to produce a maximum yield of gasoline of a given octane number.

For the purpose of controlling the severity of reforming conditions in both the upper and the lower reforming zones to produce the determined results, product or reformate withdrawal lines 154 and 154a are provided with valves 170 and 171 which are throttle valves of any suitable design whereby the volume of vapors passing therethrough can be regulated. When desirable valves 170 and 171 can be located in the system after the product vapors are cooled. Valves 170 and 171 are employed to regulate the flow of effluent vapors from the upper and lower portions of the reactor in such a manner that about 20 to 50 per cent and preferably about 35 to 48 per cent of the vapors of the charge pass through the upper reforming zone and the balance pass through the lower reforming zone. For cases to be discussed later in which the two reactor sections do not contain equal amounts of catalyst the valves can be adjusted such that as much as 80% but preferably not over 65% of the vapors pass to the upper section. The data for such an operation in which the charge to be reformed is introduced into the reactor at about the midpoint thereof and valves 170 and 171 are regulated to pass about 40 per cent of the vapors of the charge through the upper half of the reactor and 60 per cent of the vapors of the charge through the lower half of the reactor are presented in Table II.

Table II

Feed: Virgin East Texas Naphtha (BR 200°–400° F.)
Catalyst: Chromia-alumina reforming catalyst
Average operating conditions in reactor:
  Operating pressure, 190 p. s. i. a.
  Space velocity, 0.7
  Vapor inlet temp., ° F., 1,050
  Catalyst inlet temp., ° F., 800
  Gas recycle ratio, Mols gas/Mols naphtha=6
  Mols hydrogen/Mols naphtha=3
  Vapor stream heat capacity/Catalyst stream heat capacity=14

| Sector of Reactor | Top | Bottom |
|---|---|---|
| Volume of Catalyst Bed, Percent of total bed | 50 | 50 |
| Volume of Vapors in Section, Percent of total feed | 40 | 60 |
| Space velocity | 0.56 | 0.84 |
| Vapor Inlet Temperature, ° F | 1,050 | 1,050 |
| Vapor Outlet Temperature, ° F | 964 | 983 |
| Av. Reactor Section Temp., ° F | 981 | 996 |
| Octane Number (F-1+3 cc. TEL) | 100 | 100 |
| Octane Number F-1 (Clear) | 93 | 93 |
| Gasoline Yield: | | |
| Vol. percent feed to reactor section | 84.5 | 84.7 |
| Vol. percent total Reactor Feed | 33.8 | 50.8 |
| Overall Gasoline Yield, Vol. percent Total reactor Feed | 84.6 | |

The overall yields of 100 octane gasoline (F-1+3 cc. TEL) for a 50–50 split of charge and for the aforediscussed 40–60 split of charge are compared in Table III.

Table III

| Section of Reactor | Case 1 | | Case 2 | |
|---|---|---|---|---|
| | Top | Bottom | Top | Bottom |
| Volume of catalyst bed as percent of total bed | 50 | 50 | 50 | 50 |
| Volume of vapors in section as percent of total feed | 50 | 50 | 40 | 60 |
| Space velocity | 0.7 | 0.7 | 0.56 | 0.84 |
| Vapor Inlet Temp., ° F | 1,050 | 1,050 | 1,050 | 1,050 |
| Vapor Outlet Temp., ° F | 969 | 981 | 964 | 983 |
| Av. Reactor Sect. Temp., ° F | 985 | 995 | 981 | 996 |
| Octane Number F-1 (Clear) | 91.6 | 95.4 | 93.0 | 93.0 |
| Octane Number (F-1+3 cc. TEL) | 99.3 | 101.2 | 100 | 100 |
| Overall Gasoline Yield, Volume percent | 83.3 | | 84.6 | |
| Overall Gasoline Octane, (F-1+3 cc. TEL) | 100.0 | | 100.0 | |
| Increase Yield Gasoline, Vol. percent of charge | | | [1] 3 | |

[1] Equivalent to $260,000/yr./15,000 B./D.

It is manifest that other valve settings can be employed to force a greater or lesser portion of the total charge through the upper reforming zone and the balance through the lower reforming zone. Thus, valves 170 and 171 can be adjusted to cause 20 to 80 per cent and preferably 35 to 65 per cent of the vapors of the total charge to pass through the upper zone and the balance through the lower zone.

Average space velocities greater and less than 0.7 can be used. Thus, the average space velocity can be about 0.20 to 4.0 and preferably about 0.4 to 2.0 while the liquid space velocity in the lower one zone is about 1 to 4 and preferably about 1.7 to about 2 times the liquid space velocity in the upper zone.

For greater flexibility a reactor, reformer or converter such as that illustrated in Figure 3 can be used. Catalyst enters reactor 216 from a reactor sealing means, through conduit 215 and leaves reactor or converter 216 through conduit 217 to pass through a suitable reactor sealing means to the regenerator or kiln such as shown in Figure 1. A paraffinic mixture of hydrocarbons such as a straight-run naphtha or a mixed naphtha comprising a mixture of straight-run and cracked naphtha is drawn from a source not shown, heated in a furnace not shown and introduced through line 252 under regulation of valve 253 into a manifold 255 having branches 256, 258, 260, 262, 264 and 266 flow through which is cut-off by valves 257, 259, 261, 263, 265 and 267 respectively. By the use of a plurality of spaced-apart reactant inlets, the catalyst bed in reactor 216 can be divided into upper and lower reforming zones of varied effective length. Thus, when the reactant vapors enter reactor 216 through branch 256, the effective length or volume of the upper zone is about 20 per cent of the total catalyst bed volume. When reactant inlet 258 is used and the other branches are closed, the effective volume of the upper reforming zone is about 40 per cent of the total volume of the catalyst bed. Similarly, when reactant inlet 260 is used, the upper zone is about 50 per cent of the total catalyst bed. When inlet 262 is used, the upper zone is about 60 per cent of the total bed. For inlet 264, the figure is 80 per cent and for inlet 266, the figure is 85 per cent. Thus, the effective volume of the two reforming zones can be controlled by providing a plurality of spaced apart reactant inlets whereby the total reforming zone can be effectively divided into two reforming zones of varying volume. As will be shown hereinafter, this feature combined with the throttle valves 270 and 271 in reformate withdrawal lines 254 and 254a provides great flexibility.

When it is necessary or desirable that the reforming conversion be carried out in the presence of hydrogen or hydrogen-containing gas such as a recycle gas containing 25 to 80 per cent hydrogen and the balance $C_1$ to $C_6$ hydrocarbons, the gas can be drawn from a source not shown, heated in a furnace not shown, passed through pipe 249, regulated by valve 251 and admixed with the feed in line 252. Illustrative of an operation such as can be carried out in a reformer provided with a plurality of reactant outlets and means for distributing the reactants between two reforming zones is the following which was carried out with the reactant inlet so placed as to divide the reformer into two zones, the upper of which was 59 per cent of the total volume of the reactor, and the reactant was distributed equally to both reforming zones to make gasoline of equal octane number in both zones.

Table IV

Feed: Virgin East Texas Naphtha (BR 200°–400° F.)
Catalyst: Chromia-alumina reforming catalyst
Average operating conditions in reactor:
   Operating pressure, 190 p. s. i. a.
   Space velocity, 0.7
   Vapor inlet temp., ° F., 1050
   Catalyst inlet temp., ° F., 800
Gas recycle ratio, Mols gas/Mols naphtha=6
Hydrogen-naphtha ratio, Mols $H_2$/Mols naphtha=3
Vapor stream heat capacity/Catalyst stream heat capacity=14

| Section of Reactor | Top | Bottom |
|---|---|---|
| Volume of Catalyst Bed as percent of Total Bed | 59 | 41 |
| Volume of Vapors in Section as percent of Total Feed | 50 | 50 |
| Space Velocity | 0.59 | 0.81 |
| Vapor Inlet Temp., ° F | 1,050 | 1,050 |
| Vapor Outlet Temp., ° F | 967 | 985 |
| Average Reactor Temp., ° F | 984 | 998 |
| Octane Number F-1 (Clear) | 93 | 93 |
| Octane No. (F-1+3 cc. TEL) | 100.0 | 100.0 |
| Octane No. Total Product F-1 (Clear) | 93 | |
| Octane No. Total Product (F-1+3 cc. TEL) | 100 | |
| Overall Gasoline Yield as Vol. percent of Total Reactor Charge | 84.6 | |
| Gasoline Yield: | | |
|   Vol. percent of reactor section charge | 84.6 | 84.6 |
|   Vol. percent of total reactor charge | 42.3 | 42.3 |

It will be noted that the reforming of the east Texas naphtha with the reactor divided so that the upper zone represented about 60 per cent of the total reactor volume and with the reactant vapors distributed about equally between the upper and lower reforming zones by the setting of reformate outlet valves 270 and 271 produced a gasoline of the same octane number with a yield of about 84.6 per cent of the total naphtha charged or an increase of 1.3 per cent in excess of the yield obtained when treating the same naphtha when the volume of both the upper and lower reforming zones was the same and the vapors of the naphtha were distributed about equally between the two zones. This is made manifest by the comparison presented in Table V.

Table V

Feed: Virgin East Texas Naphtha, BR 200°–400° F.
  Octane number (F-1, clear) 42
  Octane number (F-1+3 cc. TEL) 66
Catalyst: Chromia-alumina reforming catalyst
Average operating conditions for gasoline having octane number (clear) of 93 and octane number (F-1+3 cc. TEL) of 100:
  Operating pressure, 190 p. s. i. a.
  Space velocity, 0.7
  Vapor inlet temp., ° F., 1,050
  Catalyst inlet temp., ° F., 800
  Gas recycle ratio, Mols gas/Mols naphtha=6
  Mols hydrogen/Mols naphtha=3
  Vapor stream heat capacity/Catalyst stream heat capacity=14

| Case | I | | II | | III | |
|---|---|---|---|---|---|---|
| Section of Reactor | Top | Bottom | Top | Bottom | Top | Bottom |
| Volume of Catalyst Bed as percent of Total Bed | 50 | 50 | 50 | 50 | 59 | 41 |
| Volume of Vapors in Section as percent of Total Feed | 50 | 50 | 40 | 60 | 50 | 50 |
| Space Velocity | 0.7 | 0.7 | 0.56 | 0.84 | 0.59 | 0.85 |
| Vapor Inlet Temp., ° F | 1,050 | 1,050 | 1,050 | 1,050 | 1,050 | 1,050 |
| Vapor Outlet Temp., ° F | 981 | 981 | 964 | 983 | 967 | 985 |
| Average Reactor Section Temperature, ° F | 985 | 995 | 981 | 996 | 984 | 998 |
| Octane No.: | | | | | | |
|   F-1 (Clear) | 91.6 | 95.4 | 93.0 | 93.0 | 93.0 | 93.0 |
|   (F-1+3 cc. TEL) | 99.3 | 101.2 | 100.0 | 100.0 | 100.0 | 100.0 |
| Gasoline Yield, Vol. Percent Reactor Section Charge | 86.6 | 80.0 | 84.5 | 84.7 | 84.6 | 84.6 |
| Vol. Percent Total Reactor Charge | 43.3 | 40.0 | 33.8 | 50.8 | 42.3 | 42.3 |
| Overall Gasoline Yield Volume Percent Total Feed | 83.3 | | 84.6 | | 84.6 | |
| Increase Yield Gasoline Vol. percent Total Feed | | | 1.3 | | 1.3 | |

A study of the data presented in Table V clearly establishes that a greater yield of gasoline having a required octane number can be obtained either by distributing the naphtha feed in a critical ratio between two zones of equal catalyst volume or distributing the naphtha feed equally between two zones of critical ratio of catalyst volume.

Those skilled in the art will recognize that the same results can be obtained with two reactors of equal capacity in series and fixed reactant inlets as illustrated in Figure 4 as can be obtained with one reactor having a fixed reactant inlet or with two reactors of unequal capacity in series and fixed reactant inlet. In other words, reactors 316 and 316a can be of equal catalyst volume or of unequal catalyst volume and each provided with one reactant inlet. Thus, for example, when the catalyst volumes of reactors 316 and 316a is equal the conditions of case II obtain when 40 per cent of the naphtha feed passes through reactor 316 and 60 per cent of the naphtha feed passes through reactor 316a. It is also manifest that the naphtha feed can be distributed between the two reactors of equal volume in other ratios such that between 20 and 50 per cent and preferably between 35 and 48 per cent of the naphtha feed passes through reactor 316.

Similarly, the catalyst volumes of reactors 316 and 316a can be different and the distribution of the naphtha feed different. Thus, for a combination in which the catalyst volume of reactor 316 is 70 per cent of the sum of the catalyst volumes of reactors 316 and 316a and the catalyst volume of reactor 316a is 30 per cent, the naphtha is distributed with at least 40 per cent and not over 67 per cent of the total naphtha feed passing through reactor 316.

Referring now to Figure 4; the reactors illustrated are of equal catalyst volume, i. e., the equivalent of the 50–50 catalyst bed split illustrated by case II discussed hereinbefore. The catalyst flows from a suitable feed bin such as bin 11 of Figure 1 through a reactor sealing means such as illustrated in Figure 1 and conduit 315 into reactor 316. The catalyst passes as a substantially compact column downwardly through reactor 316, thence through conduit 378 into reactor 316a. The catalyst passes downwardly as a substantially compact column through reactor 316a, flows therefrom through conduit 317 and a suitable reactor sealing means such as illustrated in Figure 1 and thence to the regenerator in any suitable manner.

Naphtha or any other suitable feed is drawn from a source not shown, heated in a furnace not shown, passed through lines 349 and 357 regulated by valve 372, and thence into reactor 316. Under regulation of valve 351 charge stock passes from line 349 through line 359 into reactor 316a.

When the reforming conversion is carried out in the presence of hydrogen, hydrogen or hydrogen-containing gas such as recycle gas drawn from a source not shown and heated in a furnace not shown passes through pipe 352 to line 349 (regulation of flow is obtained by means of valve 353) to be admixed with the charge to the reactors.

Reformate is withdrawn from the reactors through lines 354 and 354a under control of valve 370 and 371 respectively. Valves 370 and 371 are throttle valves and set to permit the predetermined volume of reactants passing through the reactor per unit of time, thus controlling the space velocity within the reforming zone. By means of valves 374 and 376 the separate reformates can be passed through lines 373 and 375 to be combined and withdrawn as a mixed product through line 377 to such further treatment as required.

As has been emphasized hereinbefore the ratio of the vapor stream heat capacity to the catalyst stream heat capacity, the distribution of the charge to the two reforming zones and the volume of the two reforming zones can be varied within certain limits. In the following tabulation are given the optimum reactor bed split and flow split for several vapor stream heat capacity to catalyst stream heat capacity ratios for a reaction rate which doubles for each 20° F. increase in reaction temperature.

*Table VI*

Constant conditions:
   Feed: Virgin East Texas Naphtha, B R 200°–400° F.
      Octane number, clear (F-1+3 cc. TEL) 66
   Heat of reaction (endothermic) 68 B. t. u./lb. vapor feed
   Catalyst: Chromia-alumina reforming catalyst
   Average space velocity, 0.7 liquid vol. charge/volume of catalyst/hour.
   Reformate from both reforming section have same octane numbers

| Vapor Stream Heat Capacity/ Catalyst Stream Heat Capacity | 100 | 50 | 20 | 14 | 10 | ²5 |
|---|---|---|---|---|---|---|
| Vol. percent of Bed in Top Section | 52 | 54 | 56 | 59 | 63 | 77 |
| Vol. Percent of Total Vapors Through Top Section | 50 | 50 | 50 | 50 | 50 | 50 |
| Space Velocity, Top Section | 0.67 | 0.65 | 0.62 | 0.59 | 0.56 | 0.45 |
| Space Velocity, Bottom Section | 0.73 | 0.76 | 0.80 | 0.85 | 0.95 | 1.52 |
| Vol. Percent of Bed in Top Section | 50 | 50 | 50 | 50 | 50 | 50 |
| Vol. Percent of Total Vapors Through Top Section | 48 | 46 | 46 | 40 | (¹) | (¹) |
| Space Velocity, Top Section | 0.67 | 0.65 | 0.62 | 0.56 | (¹) | (¹) |
| Space Velocity, Bottom Section | 0.73 | 0.76 | 0.79 | 0.84 | (¹) | (¹) |
| Vol. Percent of Bed in Top Section | 70 | 70 | 70 | 70 | 70 | 70 |
| Vol. Percent of Total Vapors Through Top Section | 67 | 64 | 60 | 54 | 42 | (¹) |
| Space Velocity, Top Section | 0.67 | 0.64 | 0.60 | 0.54 | 0.42 | (¹) |
| Space Velocity, Bottom Section | 0.77 | 0.84 | 0.93 | 1.07 | 1.35 | (¹) |

¹ Heat capacity of the catalyst stream becomes controlling in the top section of the reactor before the vapor flow to the top section can be reduced enough to obtain equal octane numbers.
² More than 70 percent of the catalyst bed is needed above the reactant inlet before octane number of products from both sections can be equalized.

Those skilled in the art will recognize that the description provided hereinbefore is that of a method of a continuous process for reforming petroleum naphthas to improve their octane rating wherein a catalyst is passed downwardly through two reforming stages in series, and wherein a portion of the reactant is passed upwardly through the upper reforming zone and the remaining portion of the reactant or charge or feed is passed downwardly through the lower zone and wherein the relative rates of catalyst and reactant throughput are controlled so that the heat capacity of the reactant stream controls, i. e., the ratio of the product of the pounds of reactant per hour and its specific heat to the product of the pounds of catalyst per hour and its specific heat is greater than at least 1 and wherein the reactant stream is introduced in a preheated condition so as to supply to the reforming zones a major proportion, for example, at least 75 per cent of the heat required for the conversion, in which the improvement is that of controlling the space velocity of the reactant in the two reforming stages so that the space velocity in the lower reforming zone exceeds that in the upper reforming zone to an extent sufficient to maintain the gasoline yields in the reformate streams from the two reforming zones substantially equal, whereby the overall yield of gasoline for required octane number is maintained at a maximum.

I claim:

1. A continuous process for reforming hydrocarbon mixtures to improve the octane rating thereof which comprises passing a reforming catalyst downwardly as a compact column through two reforming zones in series, heating a hydrocarbon mixture to a temperature sufficient to vaporize said hydrocarbon mixture and to supply to said reforming zones a major portion of the heat required for the reforming conversion, passing a portion of said heated hydrocarbon mixture upwardly through the upper reforming zone and the balance of said heated hydrocarbon mixture downwardly through the lower reforming zone, controlling the relative rates of passage of catalyst and heated hydrocarbon mixture through said reforming zones so that the ratio of the product of the pounds of hydrocarbon mixture passed through the zones per hour and its specific heat to the product of the pounds of catalyst passed through said reforming zones and its specific heat is greater than 1 and regulating the space velocity of the hydrocarbon mixture in the two reforming zones so that the space velocity in the lower reforming zone exceeds the space velocity in the upper zone to an extent sufficient to maintain the gasoline yields in the reformate streams from the two reforming zones substantially equal whereby the overall yield of the gasoline of required improved octane rating is maintained at a maximum.

2. The continuous process for reforming hydrocarbon mixtures to improve the octane rating thereof as set forth and described in claim 1, wherein at least 75 per cent of the heat required for the reforming conversion is supplied by the stream of heated hydrocarbon mixture.

3. The continuous process for reforming hydrocarbon mixtures to improve the octane rating thereof as set forth and described in claim 1 wherein the reforming catalyst is a chromia-alumina catalyst containing at least 70 per cent oxide of aluminum and the balance oxide of chromium.

4. The continuous process for reforming hydrocarbon mixtures to improve the octane rating thereof as set forth and described in claim 1 wherein at least 75 per cent of the heat required for the reforming conversion is supplied by the stream of heated hydrocarbon mixture, the catalyst beds are of equal volume, and the liquid space velocity in the lower reforming zone is about 1 to about 4 times the liquid space velocity in the upper zone.

5. The continuous process for reforming hydrocarbon mixtures to improve the octane rating thereof as set forth and described in claim 1 wherein at least 75 per cent of the heat required for the reforming conversion is supplied by the stream of heated hydrocarbon mixture, the catalyst beds are of equal volume, and the liquid space velocity in the lower reforming zone is about 1.1 to about 2 times the liquid space velocity in the upper zone.

6. The continuous process for reforming hydrocarbon mixtures to improve the octane rating thereof as described and set forth in claim 1 wherein at least 75 per cent of the heat required for the reforming conversion is supplied by the stream of heated hydrocarbon mixture, the major portion of the total volume of catalyst in the two reforming zones, at any time is in the upper zone and the space velocity in the lower zone is about 1 to 4 times the liquid space velocity in the upper zone.

7. The continuous process for reforming hydrocarbon mixtures to improve the octane rating thereof as described and set forth in claim 1 wherein at least 75 per cent of the heat required for the reforming conversion is supplied by the stream of heated hydrocarbon mixture, the major portion of the total volume of catalyst in the two reforming zones at any time is in the upper zone, the charge is split unequally between the upper and lower reforming zones and the liquid space velocity in the lower reforming zone is about 1 to about 4 times the liquid space velocity in the upper zone.

8. The continuous process for reforming petroleum naphtha to improve the octane rating thereof which comprises passing a reforming catalyst downwardly as a compact column through two reforming zones in a series, the upper of which has a catalyst volume of about 85 to about 52 per cent of the total catalyst volume of the two zones, heating a petroleum naphtha and a recycle gas to temperatures sufficient to vaporize said petroleum naphtha and to supply at least 75 per cent of the heat required for said reforming conversion, passing about 50 per cent of said naphtha and recycle gas upwardly through the upper reforming zone and the balance downwardly in the presence of recycle gas through the lower reforming zone, controlling the relative rate of passage of catalyst of catalyst and vapors through said reforming zones so that the ratio vapor stream heat capacity/catalyst stream heat capacity is greater than 3.

9. The continuous process for reforming petroleum naphtha to improve the octane rating thereof which comprises passing a reforming catalyst downwardly as a compact column through two reforming zones in a series of about equal catalyst volume, heating a petroleum naphtha and a hydrogen recycle gas to temperatures sufficient to vaporize said petroleum naphtha and to supply at least 75 per cent of the heat required for said reforming conversion, passing about 20 to about 50 per cent of said heated vapor upwardly through said upper zone and the balance downwardly through said lower reforming zone, controlling the relative rates of passage of catalyst and vapors through said reforming zones so that vapor stream heat capacity/catalyst stream heat capacity is greater than 10.

10. The continuous process for reforming petroleum naphtha to improve the octane rating thereof which comprises passing a reforming catalyst downwardly as a compact column through two reforming zones in a series, the upper reforming zone containing about 70 per cent of the catalyst present in both zones at any time, heating a petroleum naphtha and a hydrogen recycle gas to temperatures sufficient to vaporize said petroleum naphtha and to supply at least 75 per cent of the heat required for said reforming conversion, passing about 40 to about 67 per cent of said heated vapors upwardly through said upper reforming zone, and the balance downwardly through said lower zone, controlling the relative rates of passage of catalyst and vapors through said reforming zones so that vapor stream heat capacity/catalyst stream heat capacity is greater than 5.

References Cited in the file of this patent

UNITED STATES PATENTS

| | | |
|---|---|---|
| 2,419,517 | Eastwood | Apr. 22, 1947 |
| 2,436,340 | Upham | Feb. 17, 1948 |
| 2,531,192 | Bergstrom | Nov. 21, 1950 |